United States Patent
Ito et al.

(10) Patent No.: US 11,735,947 B2
(45) Date of Patent: Aug. 22, 2023

(54) VEHICLE SYSTEM

(71) Applicant: DENSO CORPORATION, Kariya (JP)

(72) Inventors: Yutaro Ito, Kariya (JP); Mitsuharu Higashitani, Kariya (JP); Tomomi Hase, Kariya (JP)

(73) Assignee: DENSO CORPORATION, Kariya (JP)

( * ) Notice: Subject to any disclaimer, the term of this patent is extended or adjusted under 35 U.S.C. 154(b) by 467 days.

(21) Appl. No.: 16/540,269

(22) Filed: Aug. 14, 2019

(65) Prior Publication Data

US 2019/0386508 A1 Dec. 19, 2019

Related U.S. Application Data

(63) Continuation of application No. PCT/JP2018/001415, filed on Jan. 18, 2018.

(30) Foreign Application Priority Data

Feb. 14, 2017 (JP) .................. 2017-025241

(51) Int. Cl.
| | |
|---|---|
| *H02J 7/14* | (2006.01) |
| *B60W 20/50* | (2016.01) |
| *B60W 50/12* | (2012.01) |
| *G05D 1/00* | (2006.01) |
| *G05D 1/02* | (2020.01) |
| *H02P 101/45* | (2016.01) |

(52) U.S. Cl.
CPC .............. *H02J 7/14* (2013.01); *B60W 20/50* (2013.01); *B60W 50/12* (2013.01); *G05D 1/0061* (2013.01); *G05D 1/021* (2013.01); *H02P 2101/45* (2015.01)

(58) Field of Classification Search
CPC .................. B60W 20/50; G05D 1/021; G05D 2201/0213; H02J 7/14
See application file for complete search history.

(56) References Cited

U.S. PATENT DOCUMENTS

| | | | |
|---|---|---|---|
| 2012/0152034 A1* | 6/2012 | Kaess | B62D 6/10 |
| | | | 73/862.333 |
| 2018/0050686 A1* | 2/2018 | Atluri | B60K 6/387 |
| 2018/0050704 A1* | 2/2018 | Tascione | G05D 1/0061 |

FOREIGN PATENT DOCUMENTS

| | | |
|---|---|---|
| JP | 2001-63596 A | 3/2001 |
| JP | 2012-070576 A | 4/2012 |
| JP | 2016-201956 A | 12/2016 |

OTHER PUBLICATIONS

Mar. 6, 2018 International Search Report issued in International Patent Application No. PCT/JP2018/001415.

* cited by examiner

*Primary Examiner* — Nicholas Kiswanto
*Assistant Examiner* — Christopher A Buksa
(74) *Attorney, Agent, or Firm* — Oliff PLC

(57) ABSTRACT

A vehicle system includes a generator, a battery, a detector, and a controller. The generator is configured to generate electrical power based on power transmitted from an engine of the vehicle. The battery is chargeable with the electrical power generated by the generator. The detector detects the state of charge of the battery. The controller is configured to perform autonomous driving control of the vehicle. The controller restricts operation of equipment of the vehicle when an error is detected in the detector, in comparison with when the detector is normal.

9 Claims, 9 Drawing Sheets

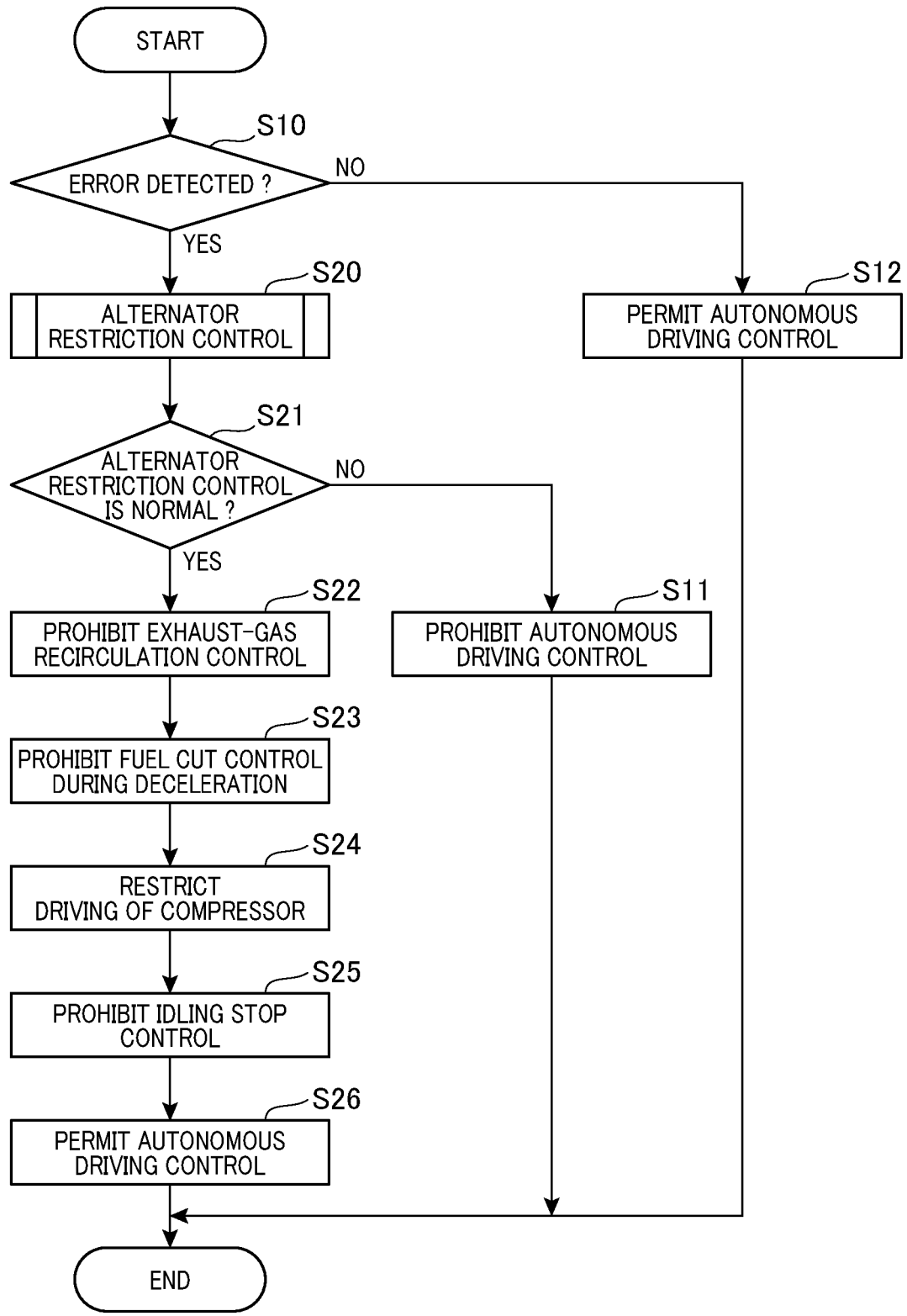

FIG.4

| CURRENT SENSOR | VOLTAGE SENSOR | TEMPERATURE SENSOR | PROCESSING CONTENT |
|---|---|---|---|
| ERROR | NORMAL | NORMAL | FIRST RESTRICTION PROCESS |
| NORMAL | ERROR | NORMAL | SECOND RESTRICTION PROCESS |
| NORMAL | NORMAL | ERROR | FIRST RESTRICTION PROCESS |
| NORMAL | ERROR | ERROR | SECOND RESTRICTION PROCESS |
| ERROR | NORMAL | ERROR | FIRST RESTRICTION PROCESS |
| ERROR | ERROR | NORMAL | THIRD RESTRICTION PROCESS |
| ERROR | ERROR | ERROR | THIRD RESTRICTION PROCESS |

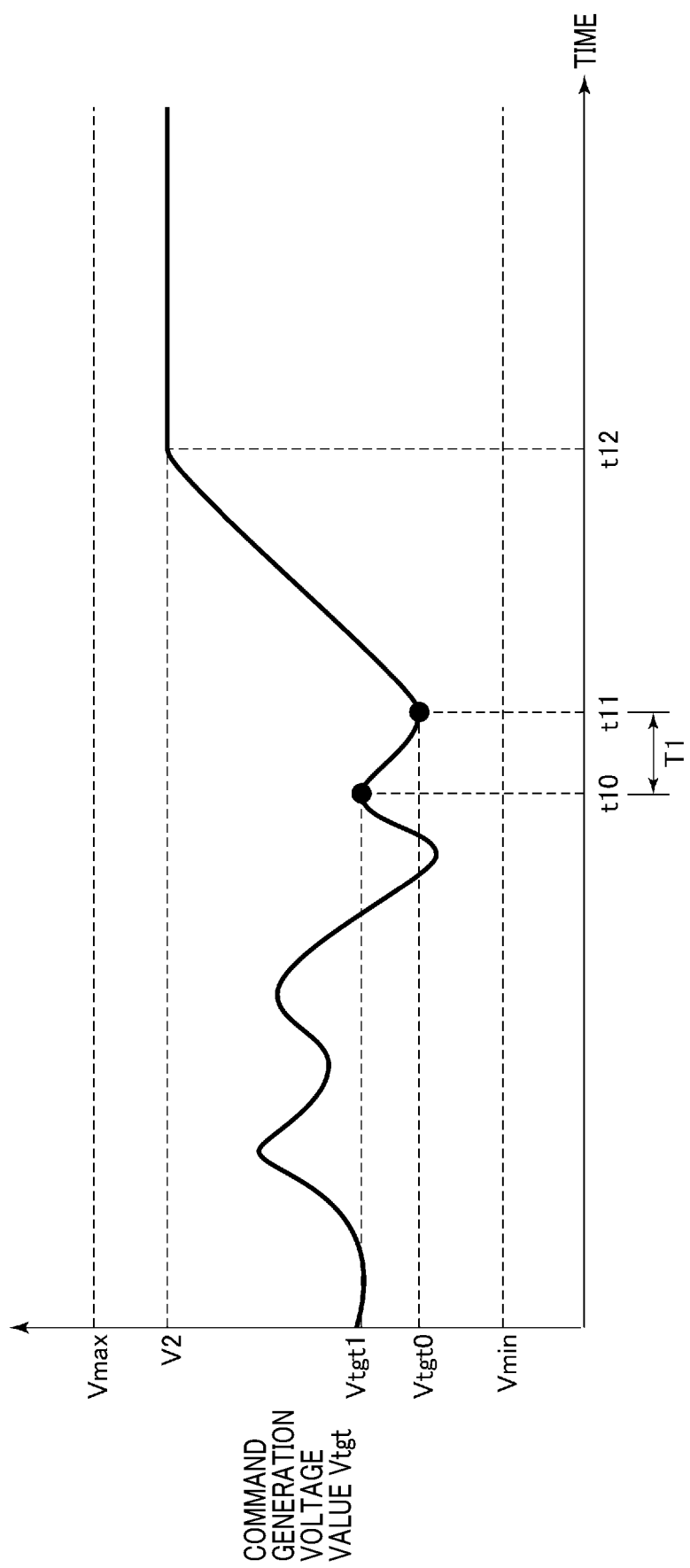

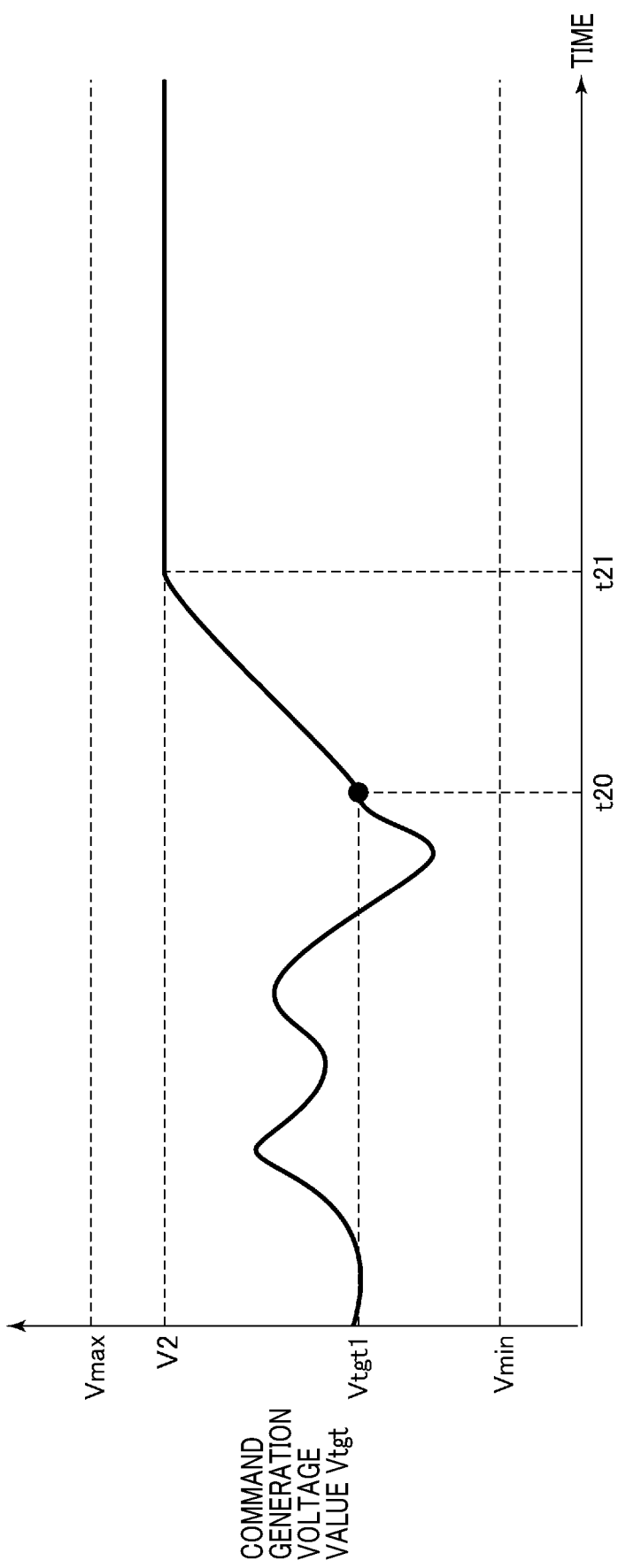

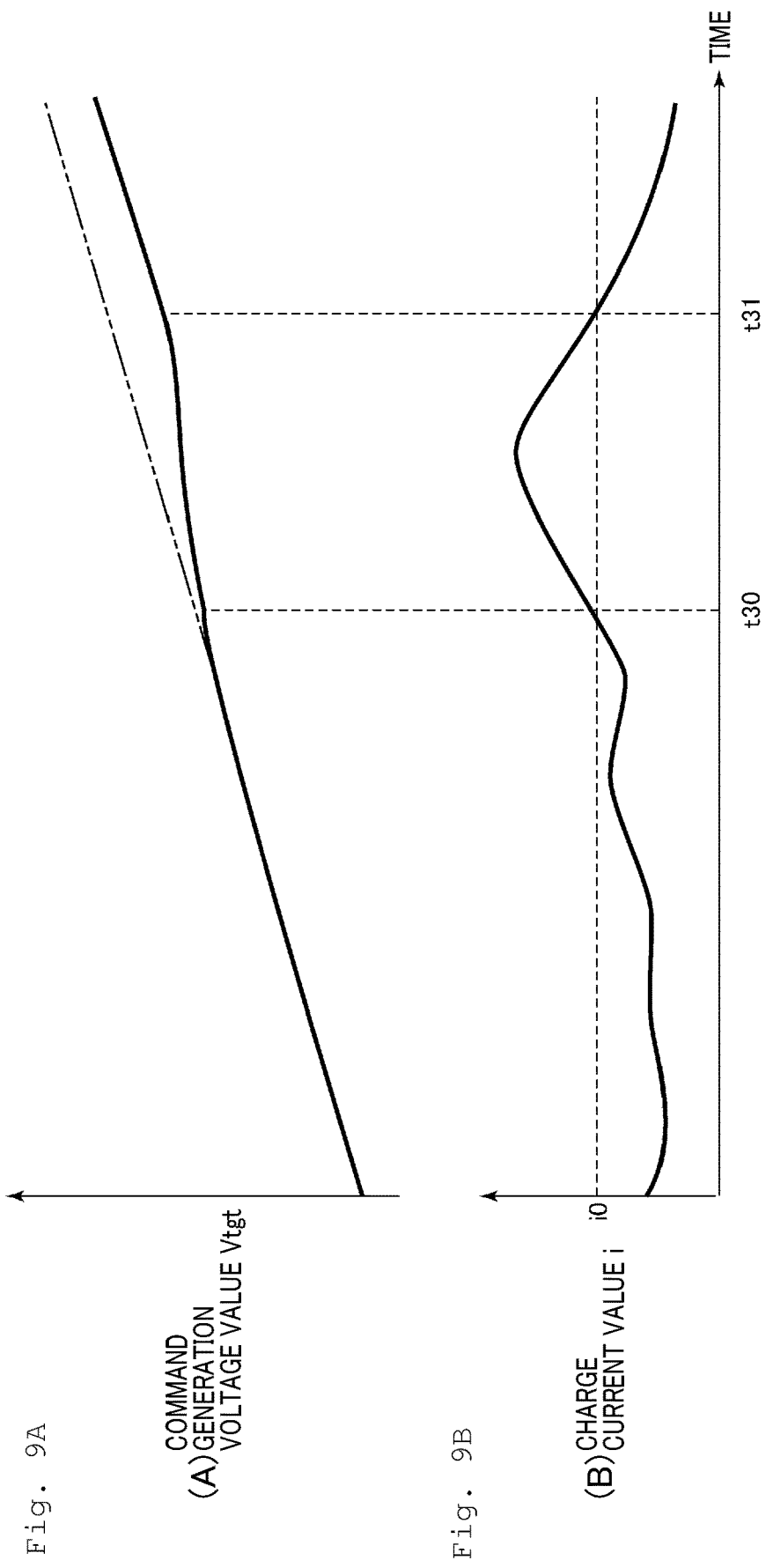

VEHICLE SYSTEM

CROSS REFERENCE TO RELATED APPLICATION

This application is a U.S. application under 35 U.S.C. 111(a) and 363 that claims the benefit under 35 U.S.C. 120 from International Application No. PCT/JP2018/001415 filed on Jan. 18, 2018, the entire contents of which are incorporated herein by reference. This application is also based on and claims the benefit of priority from Japanese Patent Application No. 2017-025241 filed on Feb. 14, 2017 and the entire content of that patent application is incorporated herein by reference.

BACKGROUND

Technical Field

The present disclosure relates to a vehicle system.

Background Art

A conventional power supply for a vehicle includes a current sensor and a control device. The current sensor detects a current flowing through a battery of the vehicle and outputs a signal corresponding to the detected current value. The control device monitors the state of charge of the battery on the basis of output signals from the current sensor.

SUMMARY

A vehicle system according to an aspect of the present disclosure includes a generator, a battery, a detector, and a controller. The generator is configured to generate electrical power. The battery is chargeable with the electrical power generated by the generator. The detector detects the state of charge of the battery. The controller restricts operation of equipment of the vehicle when an error is detected in the detector.

BRIEF DESCRIPTION OF THE DRAWINGS

FIG. 3 is a flow chart illustrating the steps in a process executed by an autonomous driving ECU according to a second embodiment.

FIG. 4 is a table illustrating the detailed control content of alternator restriction control executed by the autonomous driving ECU according to the second embodiment.

FIG. 7 is a graph illustrating the change of a command generation voltage value of the alternator according to the second embodiment.

FIG. 8 is a graph illustrating the change of a command generation voltage value of the alternator according to the second embodiment.

FIGS. 9(A) and 9(B) are graphs illustrating the change of a command generation voltage value and a charge current value of the alternator according to the second embodiment.

DETAILED DESCRIPTION OF THE PREFERRED EMBODIMENTS

Figure 1:
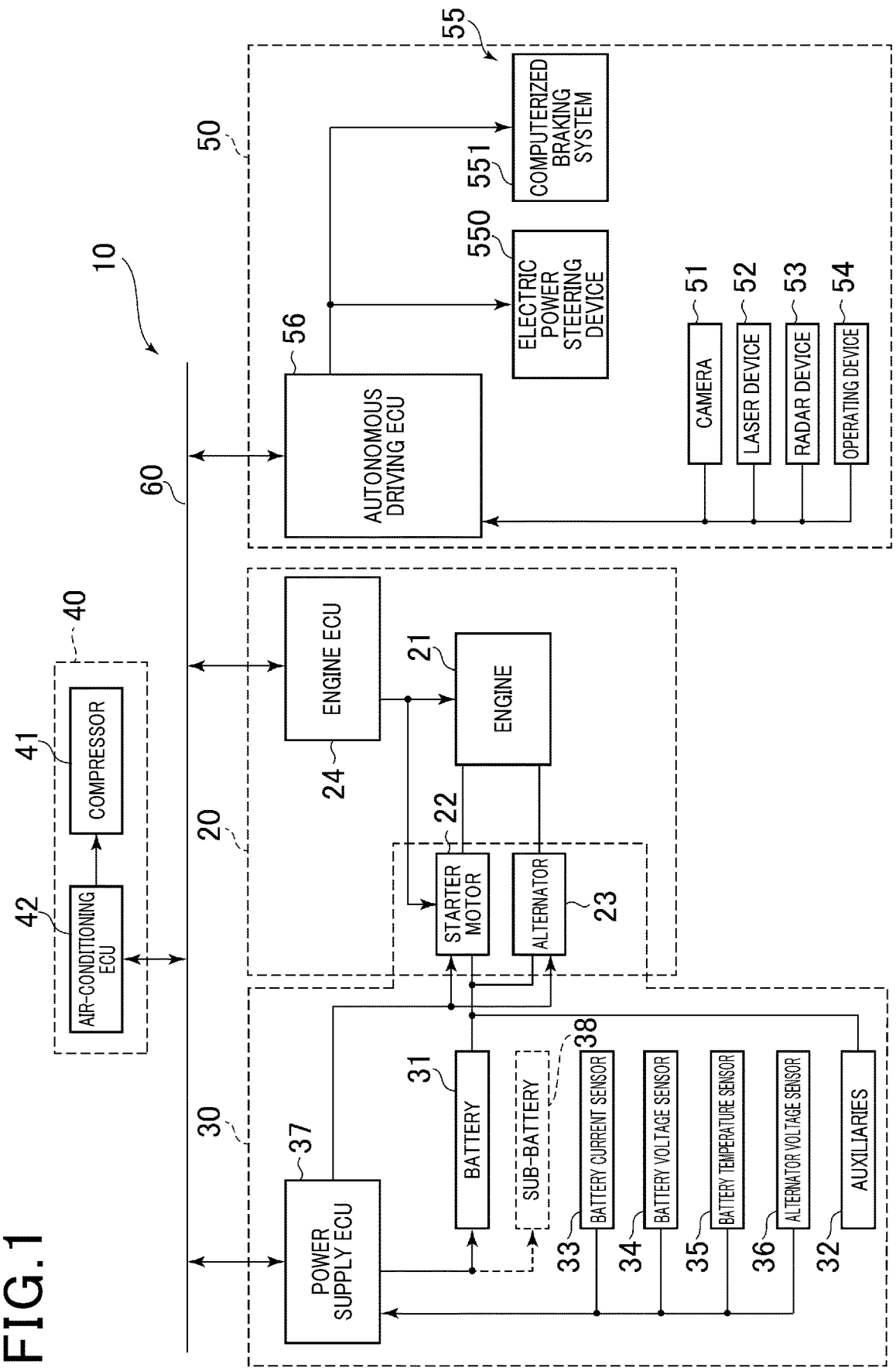
FIG. 1 is a block diagram illustrating the overall configuration of a vehicle system according to a first embodiment.

The inventor of the present disclosure has studied a vehicle system that can more appropriately maintain vehicle travel when an error occurs in a detector for detecting the state of charge of a battery.

A vehicle capable of autonomous driving needs to automatically control various types of equipment, such as an electric power steering device and a computerized braking system, to achieve autonomous driving control. However, when the battery charge level is low or when an error occurs in the battery, it is difficult to supply electrical power to the various types of equipment to achieve automatic autonomous driving control. Thus, when autonomous driving control is performed, the state of charge of the battery is also monitored.

In the case of monitoring of the state of charge of the battery through a conventional method, the state of charge cannot be appropriately monitored if an error occurs in the current sensor. As a result, the autonomous driving control may be interrupted.

Note that such an issue is common to not only vehicle systems that use current sensors as sensors for monitoring the state of charge of batteries but also vehicle systems that monitor the state of charge of batteries through predetermined detectors, such as voltage sensors for detecting the output voltage of the batteries or temperature sensors for detecting the temperature of the batteries.

An object of the present disclosure is to provide a vehicle system that can more appropriately maintain vehicle travel when an error occurs in a detector for detecting the state of charge of a battery.

A vehicle system according to an aspect of the present disclosure includes a generator, a battery, a detector, and a controller. The generator is configured to generate electrical power based on power transmitted from an engine of the vehicle. The battery is chargeable with the electrical power generated by the generator. The detector detects the state of charge of the battery. The controller is configured to perform autonomous driving control of the vehicle. The controller restricts operation of equipment of the vehicle when an error is detected in the detector in comparison with when the detector is normal.

With such a configuration, when an error occurs in a detector for detecting the state of charge of a battery, operation of the equipment of the vehicle is restricted. This can prevent failure caused by normal operation of the equipment of the vehicle under a circumstance in which an error has occurred in the detector. Thus, vehicle travel can be more appropriately maintained.

A vehicle system according to embodiments will now be described with reference to the drawings. Same components in the drawings are denoted by same reference signs as much as possible, and redundant description thereof will be omitted, to facilitate understanding of the description.

First Embodiment

A vehicle system according to a first embodiment will now be described. The overall configuration of a vehicle on which the vehicle system according to a first embodiment is installed will now be described.

With reference to FIG. 1, the vehicle system 10 includes a power system 20, a power supply system 30, an air-conditioning system 40, and an autonomous driving system 50.

The power system 20 is a section that comprehensively manages the power of the vehicle. The power system 20 includes an engine 21, a starter motor 22, an alternator 23, and an engine ECU (electronic control unit) 24.

The engine 21 is an internal combustion engine generating power for the vehicle to travel.

The starter motor 22 cranks the engine 21 based on the electrical power supplied from a battery 31 installed on the vehicle, to start the engine 21.

The alternator 23 generates electrical power based on the power transmitted from the engine 21. The electrical power generated by the alternator 23 charges the battery 31. In this embodiment, the alternator 23 corresponds to a generator.

The engine ECU 24 mainly includes a microcomputer including a CPU and a memory. The engine ECU 24 comprehensively controls the engine 21.

Specifically, the engine ECU 24 performs so-called engine start control for starting the engine 21 when an engine start operation by the driver is detected. The engine ECU 24 controls the driving of the engine 21 on the basis of the travelling speed of the vehicle, the temperature of the engine coolant, the depression of the acceleration pedal, the intake air volume, etc.

Furthermore, the engine ECU 24 performs idling stop control, exhaust-gas recirculation control, and fuel cut control. Idling stop control automatically stops the engine 21 when the vehicle temporally stops, to improve the fuel efficiency of the vehicle. Exhaust-gas recirculation control recirculates some of the exhaust gas after combustion in the engine 21, to reduce nitrogen oxide emission in the exhaust gas and improve the fuel efficiency of the vehicle. Fuel cut control temporarily stops fuel injection to the engine 21 during deceleration of the vehicle, to improve the fuel efficiency of the vehicle.

The power supply system 30 is a section that comprehensively manages the electrical power charge and discharge of the battery 31 installed in the vehicle and electrical power supply to auxiliaries 32.

The battery 31 includes a secondary battery, such as a lithium ion battery that can be charged and discharged. The battery 31 is charged with the electrical power generated by the alternator 23. The battery 31 supplies electrical power to the starter motor 22 and also to the auxiliaries 32. The auxiliaries 32 are various devices that receive electrical power from the battery 31. Note that the auxiliaries 32 include the starter motor 22.

The power supply system 30 includes a battery current sensor 33, a battery voltage sensor 34, a battery temperature sensor 35, an alternator voltage sensor 36, and a power supply ECU (electronic control unit) 37.

The battery current sensor 33 detects a charge current value and a discharge current value of the battery 31 and outputs signals corresponding to the detected charge current value and the discharge current value of the battery 31. The battery voltage sensor 34 detects a terminal voltage value of the battery and outputs a signal corresponding to the detected terminal voltage value of the battery 31. The battery temperature sensor 35 detects the temperature of the battery 31 and outputs a signal corresponding to the detected temperature of the battery 31. In this embodiment, the battery current sensor 33, the battery voltage sensor 34, and the battery temperature sensor 35 each correspond to a detector for detecting the state of charge of the battery 31.

The alternator voltage sensor 36 detects a generation voltage value of the alternator 23 and outputs a signal corresponding to the detected generation voltage value.

The power supply ECU 37 mainly includes a microcomputer including a CPU and a memory. The power supply ECU 37 comprehensively controls the state of power charge and discharge of the battery 31 and the state of the electrical power supply to the auxiliaries 32.

Specifically, the power supply ECU 37 acquires information on the charge current value and the discharge current value of the battery 31, the terminal voltage value of the battery 31, and the temperature of the battery on the basis of the output signals from the sensors 33 to 36. The power supply ECU 37 calculates an SOC (state of charge) value of the battery 31 on the basis of such information. The SOC value represents the charged state of the battery 31 within the range of 0% to 100%, where a completely discharged state of the battery 31 is defined as 0% and a fully charged state of the battery 31 as 100%. The power supply ECU 37 controls the charge and discharge of the battery 31 on the basis of the SOC value of the battery 31. The power supply ECU 37 controls the electrical power supply to the auxiliaries 32 on the basis of the SOC value of the battery 31.

The power supply ECU 37 monitors for any errors in the battery current sensor 33, the battery voltage sensor 34, and the battery temperature sensor 35. Specifically, the sensors 33 to 35 have redundant structures. The power supply ECU 37 compares multiple redundant signals from the sensors 33 to 35 and determines any errors in the sensors 33 to 35 on the basis of the results of the comparison.

Furthermore, the power supply ECU 37 detects a generation voltage value of the alternator 23 on the basis of a signal output from the alternator voltage sensor 36. The power supply ECU 37 sets a command generation voltage value Vtgt of the alternator 23 on the basis of the generation voltage value of the alternator 23, the electrical power consumption of the auxiliaries 32, etc. and sends the set command generation voltage value Vtgt to the alternator 23, to control the alternator 23. The alternator 23 adjusts the generation voltage value to achieve the command generation voltage value Vtgt sent from the power supply ECU 37 as a target value.

The air-conditioning system 40 generates air-conditioning air from interior and exterior air of the vehicle and supplies the air-conditioning air to the interior of vehicle, to adjust the temperature of the interior of the vehicle. The air-conditioning system 40 includes a compressor 41 and an air-conditioning ECU 42.

The compressor 41 is a component of a refrigeration cycle device of the air-conditioning system 40. The refrigeration cycle device includes a condenser, an expansion valve, and an evaporator, in addition to the compressor 41. The refrigeration cycle device cools the air-conditioning air. A coolant circulates the refrigeration cycle device through the compressor 41, the condenser, the expansion valve, and the evaporator, in this order. The evaporator evaporates the coolant through heat exchange between the air-conditioning air and the low-pressure coolant expanded at the expansion valve, and cools the air-conditioning air by the evaporative latent heat generated during the evaporation. The compressor 41 is driven by the power transmitted from the engine 21 to compress the coolant evaporated at the evaporator into a high-temperature, high-pressure coolant and expels the compressed coolant to the condenser. The condenser condenses the coolant through heat exchange between air and the high-temperature, high-pressure coolant compressed at the compressor 41, and expels the condensed coolant to the expansion valve.

The air-conditioning ECU 42 comprehensively controls the air-conditioning system 40. For example, the air-conditioning system 40 adjusts the rotational rate of the compressor 41 to control the refrigeration cycle device.

The autonomous driving system 50 is a section that comprehensively performs autonomous driving control of the vehicle. The autonomous driving system 50 includes a camera 51, a laser device 52, a radar device 53, an operating device 54, autonomous driving equipment 55, and an autonomous driving ECU (electronic control unit) 56.

The camera 51 captures images of a predetermined range around the vehicle, such as a predetermined range in front of the vehicle or a predetermined range in the rear of the vehicle, and outputs image data of the captured images. The laser device 52 is, for example, a laser radar device. The radar device 53 is, for example, a millimeter-wave radar device. The laser device 52 and the radar device 53 detect objects present in a predetermined search range around the vehicle and output signals corresponding to the detected objects. The operating device 54 is a section operated by the driver of the vehicle. The operating device 54 includes operating switches, etc. that are operated to start and stop autonomous driving.

The autonomous driving equipment 55 includes various types of equipment installed in the vehicle to establish the autonomous driving function. The autonomous driving equipment 55 includes power system equipment, brake system equipment, and steering system equipment. The power system equipment includes, for example, the engine 21 and the transmission. The brake system equipment includes, for example, a computerized braking system 551 and a braking device. The steering system equipment includes, for example, an electric power steering device 550. Note that the autonomous driving equipment 55 is also included in the auxiliaries 32 because electrical power is supplied from the battery 31 to the autonomous driving equipment 55.

The electric power steering device 550 applies to the steering wheel an assistance torque corresponding to the steering torque applied to the steering wheel of the vehicle, to perform assistance control for supporting the steering of the driver. The electric power steering device 550 performs automatic steering control in response to a request from the autonomous driving ECU 56. The automatic steering control applies torque to the steering wheel to automatically vary the steering angle of the vehicle, regardless of the steering of the steering wheel by the driver.

The computerized braking system 551 performs anti-lock braking control when the driver depresses the brake pedal, to appropriately distribute the braking force applied to the wheels in accordance with the rotational rates and the turning states of the front and rear wheels of the vehicle. The computerized braking system 551 performs automatic braking control in response to a request from the autonomous driving ECU 56. The automatic braking control automatically applies a braking force to the wheels of the vehicle, regardless of the depression operation of the brake pedal by the driver.

The autonomous driving ECU 56 mainly includes a microcomputer including a CPU and a memory. The autonomous driving ECU 56 performs autonomous driving control for comprehensively controlling the autonomous driving of the vehicle. In this embodiment, the autonomous driving ECU 56 corresponds to a controller.

The engine ECU 24, the power supply ECU 37, the air-conditioning ECU 42, and the autonomous driving ECU 56 are communicably connected to each other via an in-vehicle network 60. Thus, the engine ECU 24, the power supply ECU 37, the air-conditioning ECU 42, and the autonomous driving ECU 56 can communicate information and send instructions of operations to each other.

For example, the autonomous driving ECU 56 can communicate with the engine ECU 24 and the power supply ECU 37 to acquire information such as various state quantities of the engine 21, the SOC value of the battery 31, and the generation voltage value of the alternator 23. The autonomous driving ECU 56 instructs the engine ECU 24 about the operation of the engine 21 under the autonomous driving control, and thereby can automatically control the rotational rate, etc. of the engine 21.

In response to detecting a start operation for autonomous driving by the driver on the basis of a signal output from the operating device 54, the autonomous driving ECU 56 starts the autonomous driving control. In the autonomous driving control, the autonomous driving ECU 56 according to this embodiment automatically controls at least one of the power system of the vehicle including the engine 21, the transmission and the like, the braking system of the vehicle including the computerized braking system 551, the braking device and the like, and the steering system of the vehicle including the electric power steering device 550 and the like.

For example, the autonomous driving ECU 56 detects traffic lane lines in front of the vehicle, a preceding vehicle, and an obstacle that might obstruct the traveling of the vehicle, on the basis of image data acquired by the camera 51. The autonomous driving ECU 56 detects a preceding vehicle, an obstacle, etc. on the basis of signals output from the laser device 52 and the radar device 53. The autonomous driving ECU 56 sets a target traveling line for the vehicle on the basis of the detected information on a traffic lane lines in front of the vehicle, a preceding vehicle, an obstacle, etc. and calculates a target steering angle corresponding to the target traveling line. The autonomous driving ECU 56 outputs the calculated target steering angle to the electric power steering device 550 and thereby instructs the electric power steering device 550 to perform automatic steering control based on the target steering angle. This causes the steering angle of the vehicle to vary in accordance with the target operating angle, and thus the vehicle automatically travels along the target traveling line.

The autonomous driving ECU 56 determines whether the vehicle might come into contact with a preceding vehicle or an obstacle on the basis of the position of the preceding vehicle or the obstacle. When the vehicle might come into contact with the preceding vehicle or the obstacle, the autonomous driving ECU 56 instructs the computerized braking system 551 to perform automatic braking control. This can avoid any contact of the vehicle under autonomous driving control.

If an error occurs in at least one of the battery current sensor 33, the battery voltage sensor 34, and the battery temperature sensor 35 of the vehicle system 10 according to this embodiment, the SOC value of the battery 31 cannot be appropriately detected. Under such circumstance, the power supply ECU 37 cannot appropriately control the charge and discharge state of the battery 31. Thus, if the autonomous driving control is performed in this state, an unexpected power shortage may occur in the auxiliaries 32, making it unable to maintain autonomous driving control.

Thus, if an error occurs in at least one of the battery current sensor 33, the battery voltage sensor 34, and the battery temperature sensor 35, the autonomous driving ECU 56 according to this embodiment prohibits autonomous driving control.

The steps of this process will now be described in detail with reference to FIG. 2. The autonomous driving ECU 56 repeats the process illustrated in FIG. 2 at a predetermined cycle.

Figure 2:
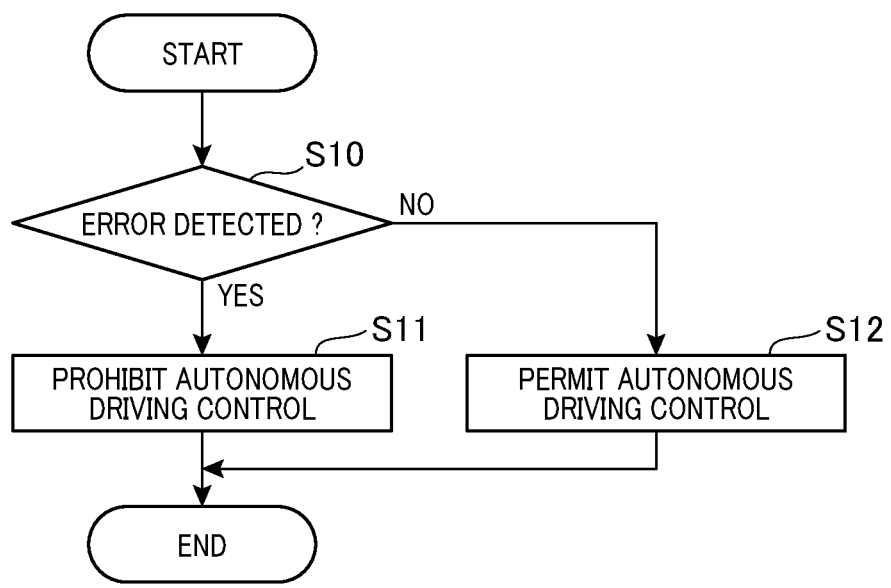
FIG. 2 is a flow chart illustrating the steps in a process executed by an autonomous driving ECU according to the first embodiment.

As illustrated in FIG. 2, in step S10, the autonomous driving ECU 56 determines whether an error has occurred in at least one of the battery current sensor 33, the battery voltage sensor 34, and the battery temperature sensor 35. Specifically, the autonomous driving ECU 56 acquires information on the presence of an error in each of the sensors 33 and 35 from the power supply ECU 37 and determines whether an error has occurred in at least one of the sensors 33 to 35 on the basis of the acquired information.

If a positive determination is made or if an error has occurred in at least one of the sensors 33 to 35 in step S10, the autonomous driving ECU 56 prohibits autonomous driving control in step S11. In such a case, the autonomous driving ECU 56 does not start and perform autonomous driving control even if the driver operates the operating device 54 to start autonomous driving.

If a negative determination is made or if all sensors 33 to 35 are normal in step S10, the autonomous driving ECU 56 permits autonomous driving control in step S12. In such a case, the autonomous driving ECU 56 starts normal autonomous driving control when the driver operates the operating device 54 to start autonomous driving mode.

The vehicle system 10 according to the embodiment described above can achieve the operations and the advantageous effects described in (1) and (2) below. (1)

If normal autonomous driving control is performed despite an error in the sensors 33 to 35 or inappropriate detection of the SOC value of the battery 31, an inconvenient situation, such as a power shortage of the battery 31, may occur, and it might not be possible to appropriately maintain autonomous driving control. In this regard, the autonomous driving ECU 56 according to this embodiment prohibits autonomous driving control when an error is detected in the sensors 33 to 35. In specific, when an error is detected in the sensors 33 to 35, the autonomous driving ECU 56 restricts the operation of the autonomous driving equipment 55 in comparison with when the sensors 33 to 35 are normal. In this way, a situation in which a failure in autonomous driving control occurs due to inappropriate detection of the SOC value of the battery 31 can be avoided. As a result, vehicle travel can be more appropriately maintained.

(2) The autonomous driving ECU 56 prohibits autonomous driving control to restrict the operation of the autonomous driving equipment 55. In this way, a situation in which a failure in autonomous driving control occurs can be more appropriately avoided.

Second Embodiment

A vehicle system 10 according to a second embodiment will now be described. The differences from the first embodiment will mainly be described below.

The autonomous driving ECU 56 according to this embodiment performs the process illustrated in FIG. 3, in place of the process illustrated in FIG. 2. As illustrated in FIG. 3, if a positive determination is made or if an error occurs in at least one of the battery current sensor 33, the battery voltage sensor 34, and the battery temperature sensor 35 in Step S10, the autonomous driving ECU 56 sends the command generation voltage value Vtgt of the alternator 23 to the power supply ECU 37 in step S20, to perform alternator restriction control to restrict the generation voltage value of the alternator 23 to be within a predetermined range.

Specifically, as illustrated in FIG. 4, the autonomous driving ECU 56 selectively executes a first restriction process, a second restriction process, and a third restriction process in accordance with the state of the sensors 33 to 35. The first to third restriction processes are basically processes of gradually increasing the command generation voltage value Vtgt of the alternator 23. The reason the command generation voltage value Vtgt of the alternator 23 should be gradually increased is as follows.

Figure 5:
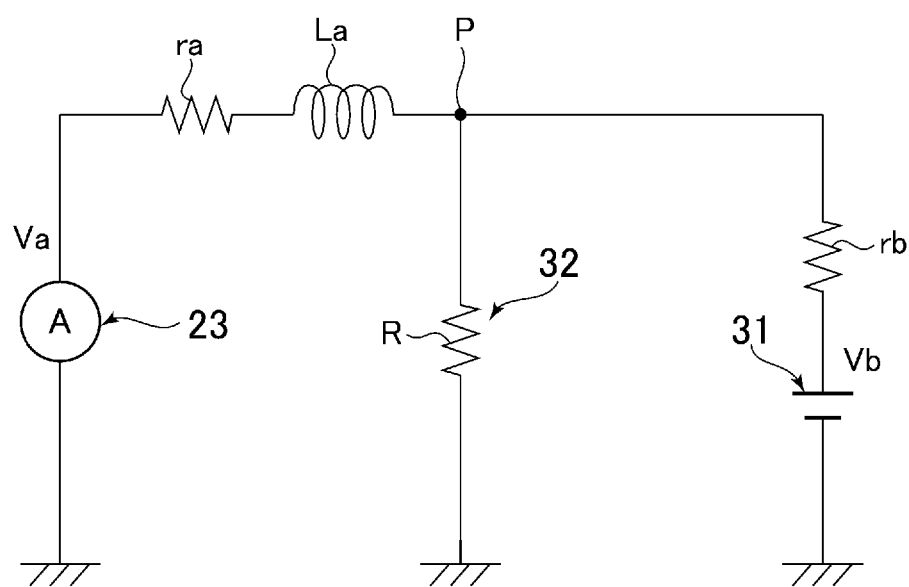
FIG. 5 is a circuit diagram illustrating the outline of power paths of an alternator, a battery, and auxiliaries according to the second embodiment.

FIG. 5 is a circuit diagram illustrating an outline of power paths of the alternator 23, the battery 31, and the auxiliaries 32. In FIG. 5, the reference sign "Va" indicates the generation voltage value of the alternator 23. The reference sign "ra" indicates the internal resistance of the alternator. The reference sign "La" indicates the inductance of the internal and the power cable of the alternator 23. The reference sign "R" indicates the load resistance of the auxiliaries 32. The reference sign "rb" indicates the internal resistance of the battery 31. The reference sign "Vb" indicates the terminal voltage value of the battery 31.

When the terminal voltage value Vb of the battery 31 is smaller than the maximum rated voltage value of the battery 31, the generation voltage value Va of the alternator 23 being set to a predetermined voltage value Vc similar to or the same as the maximum rated voltage value of the battery 31 causes an increase in the charge current value i of the battery 31. The charge current value i increases with an increase in the difference "Vc-Vb" of the predetermined voltage value Vc and the terminal voltage value Vb of the battery 31. When a large current flows to the battery 31 or when "di/dt" increases, a voltage drop occurs due to the influence of the inductance La of the alternator 23. Furthermore, the increase in the charge current value i of the battery 31 causes an increase in the influence of the voltage drop of the internal resistance ra of the alternator 23. Due to such a complex phenomenon, the voltage at the point P in the drawing decreases, and as a result, a voltage required for driving the auxiliaries 32 may not be maintained.

For the above-described reason, by suppressing an excess increase in the charge current value i of the battery 31 through a gradual increase in the command generation voltage value Vtgt of the alternator 23, the voltage required for driving the auxiliaries 32 can be maintained.

Note that the autonomous driving ECU 56 sets the command generation voltage value Vtgt of the alternator 23 to a value smaller than or equal to a predetermined value V2 during the gradual increase of the command generation voltage value Vtgt of the alternator 23. The predetermined value V2 is set to a value larger than or equal to a minimum value Vmin of a voltage value that can drive the auxiliaries 32 and smaller than the maximum rated voltage value Vmax of the battery 31. In this way, during the gradual increase of the command generation voltage value Vtgt of the alternator 23, overcharge of the battery 31 can be avoided while the least operation of the auxiliaries 32 is maintained.

Specifically, as illustrated in FIG. 4, when the battery voltage sensor 34 is normal and at least one of the battery current sensor 33 and the battery temperature sensor 35 has an error, the autonomous driving ECU 56 executes the first restriction process. The first restriction process sets the current terminal voltage value of the battery 31 detected by the battery voltage sensor 34 to an initial value Vtgt0 of the command generation voltage value Vtgt of the alternator 23 and gradually increases the command generation voltage value Vtgt of the alternator 23 from the initial value Vtgt0. In the first restriction process, the command generation voltage value is increased by a predetermined value $\Delta V1$ at a predetermined cycle, thereby gradually increasing the command generation voltage value.

When the battery current sensor 33 is normal, and an error is detected in the battery voltage sensor 34, the autonomous driving ECU 56 executes the second restriction process. The second restriction process sets the command generation voltage value Vtgt1 of the alternator 23 of the time at which an error is detected in the battery voltage sensor 34 to an initial value and gradually increases the command generation voltage value Vtgt of the alternator 23 from the initial value Vtgt1. In also the second restriction process, as in the first restriction process, the command generation voltage value Vtgt is increased, for example, by a predetermined value $\Delta V2$ at a predetermined cycle, thereby gradually increasing the command generation voltage value Vtgt. In the second control process, the increment of the command generation voltage value Vtgt is varied on the basis of the charge current value i of the battery 31 detected by the battery current sensor 33. Specifically, the autonomous driving ECU 56 executes the process illustrated in FIG. 6.

Figure 6:
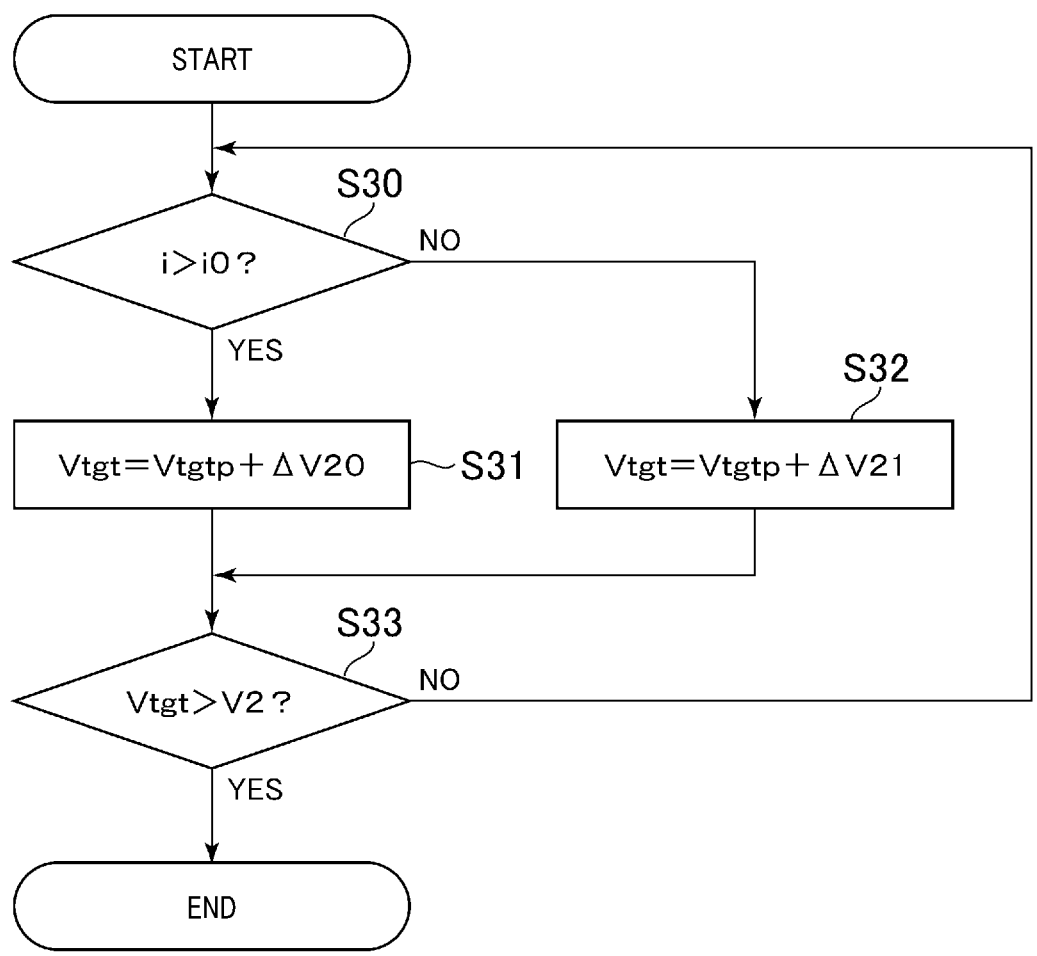
FIG. 6 is a flow chart illustrating the steps in a second restriction process executed by the autonomous driving ECU according to the second embodiment.

As illustrated in FIG. 6, the autonomous driving ECU 56 first determines whether the charge current value i of the battery 31 is larger than a predetermined value i0 in step S30. If a negative determination is made or if the charge current value i of the battery 31 is smaller than or equal to the predetermined value i0 in step S30, the autonomous driving ECU 56 sets, in step S32, the sum Vtgtp+$\Delta V21$ of the previous command generation voltage value Vtgtp and the correction value $\Delta V21$ to be the current command generation voltage value Vtgt.

In contrast, if a positive determination is made in step S30 or if the charge current value i of the battery 31 is larger than the predetermined value i0, the autonomous driving ECU 56 sets the sum Vtgtp+$\Delta V20$ of the previous command generation voltage value Vtgtp and the correction value $\Delta V20$ to be the current command generation voltage value Vtgt in step S31. The correction value $\Delta V20$ is smaller than the correction value $\Delta V21$. In specific, when the charge current value i of the battery 31 is larger than the predetermined value i0, the autonomous driving ECU 56 reduces the increment of the command generation voltage value Vtgt of the alternator 23 in comparison with when the charge current value i is smaller than or equal to the predetermined value i0.

After performing processes in steps S31 and S32, the autonomous driving ECU 56 determines in step S33 whether the command generation voltage value Vtgt exceeds the predetermined value V2. If a negative determination is made or if the command generation voltage value Vtgt is smaller than or equal to the predetermined value V2 in step S33, the autonomous driving ECU 56 returns to step S30 to continue the process to gradually increase the command generation voltage value Vtgt of the alternator 23. If a negative determination is made or if the command generation voltage value Vtgt exceeds the predetermined value V2 in step S33, the autonomous driving ECU 56 terminates the series of processing.

When errors are detected in both the battery current sensor 33 and the battery voltage sensor 34, the autonomous driving ECU 56 executes the third restriction process, as illustrated in FIG. 4. In the third restriction process, the command generation voltage value Vtgt of the alternator 23 is increased in a predetermined pattern. In the third restriction process, for example, the command generation voltage value Vtgt of the alternator 23 is set to be a predetermined initial value Vtgt2, and the command generation voltage value Vtgt of the alternator 23 is increased from the initial value Vtgt2 by a predetermined value $\Delta V3$ at a predetermined cycle.

As illustrated in FIG. 3, subsequent to step S20, the autonomous driving ECU 56 determines in step S21 whether restriction control of the alternator 23 is being normally performed. Specifically, when the deviation the generation voltage value and the command generation voltage value Vtgt of the alternator 23 is out of a predetermined range, the autonomous driving ECU 56 determines that restriction control of the alternator 23 is not performed normally. In such a case, the autonomous driving ECU 56 makes a negative determination in step S21 and prohibits autonomous driving control in step S11.

When the deviation between the generation voltage value and the command generation voltage value Vtgt of the alternator 23 is within the predetermined range, the autonomous driving ECU 56 makes a positive determination in step S21. In such a case, the generation voltage value of the alternator 23 is gradually increased, thereby maintaining a voltage required for driving the auxiliaries 32. However, if the generation voltage value of the alternator 23 becomes unstable due to an increase in the load on the engine 21 or the like, it may not be possible to later maintain the voltage required for driving the auxiliaries 32.

Thus, when a positive determination is made in step S21, the autonomous driving ECU 56 prohibits vehicle control that would lead to unstable generation by the alternator 23.

Specifically, the autonomous driving ECU 56 prohibits exhaust-gas recirculation control in the engine 21 in step S22 and prohibits fuel cut control during deceleration of the vehicle in step S23. This can suppress unstable generation by the alternator 23 due to an unstable combustion state of the engine 21.

In step S24, the autonomous driving ECU 56 sends a command signal to the air-conditioning ECU 42 to restrict the rotational rate of the compressor 41. In this way, the load on the engine 21 can be reduced, thereby suppressing unstable generation by the alternator 23.

When the generation voltage value of the alternator 23 is unstable, a decrease in the electrical power supplied to the starter motor 22 may possibly prevent restart of the engine 21. Thus, the autonomous driving ECU 56 prohibits idling stop control of the engine 21 in step S25. This can avoid a situation in which the engine 21, stopped by idling stop, cannot be restarted.

Subsequent to step S25, the autonomous driving ECU 56 permits autonomous driving control in step S26.

An example operation of the vehicle system 10 according to this embodiment will now be described.

When an error is detected in the battery current sensor 33 or the battery temperature sensor 35, the autonomous driving ECU 56 executes the first restriction process to vary the command generation voltage value Vtgt of the alternator 23 as illustrated in FIG. 7. In specific, when an error is detected in the battery current sensor 33 or the battery temperature sensor 35 at a time t10, the autonomous driving ECU 56 detects the terminal voltage value of the battery 31 with the battery voltage sensor 34 at time t10. A predetermined time period T1 after time t10 or at a time t11, the autonomous driving ECU 56 sets the terminal voltage value of the battery 31 detected at time t10 to be an initial value Vtgt0 of the command generation voltage value Vtgt of the alternator 23.

Note that predetermined time period T1 is a predetermined time period larger than zero. The autonomous driving ECU 56 gradually increases the command generation voltage value Vtgt of the alternator 23 after time t11. When the command generation voltage value Vtgt reaches a predetermined value V2 at a subsequent time t12, the autonomous driving ECU 56 maintains the command generation voltage value Vtgt at the predetermined value V2 from then on.

When an error is detected in the battery voltage sensor 34, the autonomous driving ECU 56 executes the second restriction process to vary the command generation voltage value Vtgt of the alternator 23 as illustrated in FIG. 8. Specifically, when an error is detected in the battery voltage sensor 34 at a time t20, the autonomous driving ECU 56 sets the command generation voltage value Vtgt1 of the alternator 23 set at time t20 to be an initial value and gradually increases the command generation voltage value Vtgt of the alternator 23 after time t20. When the command generation voltage value Vtgt reaches a predetermined value V2 at a subsequent time t21, the autonomous driving ECU 56 maintains the command generation voltage value Vtgt at the predetermined value V2 from then on.

It is presumed that the charge current value i of the battery 31 varies, for example, as illustrated in FIG. 9(B) while the autonomous driving ECU 56 executes the second restriction process. Specifically, it is presumed that the charge current value i of the battery 31 exceeds the predetermined value i0 at a time t30. In such a case, the autonomous driving ECU 56 decreases the correction value of the command generation voltage value Vtgt from ΔV21 to ΔV20 at time t30. In this way, the command generation voltage value Vtgt of the alternator 23 varies as illustrated in the solid line in FIG. 9(A). In specific, the command generation voltage value Vtgt of the alternator 23 falls below the comparative example, which is a variation in the command generation voltage value Vtgt in a case of continued use of the correction value ΔV21 indicated by the chain double-dashed line. This causes the charge current value i of the battery 31 to temporarily increase after time t30 as illustrated in FIG. 9(B). However, the subsequent decrease in the charge current value i can suppress a decrease in the voltage applied to the auxiliaries 32 caused by an excess increase in the charge current value i of the battery 31. That is, appropriate operation of the auxiliaries 32 can be maintained.

When the charge current value i of the battery 31 is smaller than or equal to the predetermined value i0 at a time t31, the autonomous driving ECU 56 increases the correction value of the command generation voltage value Vtgt from ΔV20 to ΔV21. Thus, the command generation voltage value Vtgt subsequently increases at a slope that is the same as that of the comparative example.

The vehicle system 10 according to the embodiment described above can achieve the operations and the advantageous effects described in (3) to (9) below, in addition to the operations and the advantageous effects described in (1) according to the first embodiment.

(3) When an error is detected in the sensors 33 to 35, the autonomous driving ECU 56 permits autonomous driving control while gradually increasing the command generation voltage value Vtgt. In this way, even when an error occurs in the sensors 33 to 35, electrical power for the auxiliaries 32 can be more certainly maintained, and thus autonomous driving control can be maintained. As a result, the vehicle travel can be more appropriately maintained.

(4) The autonomous driving ECU 56 restricts the command generation voltage value Vtgt to be smaller than the predetermined value V2 while gradually increasing the generation voltage value of the alternator 23. The predetermined value V2 is set to be larger than or equal to a minimum value Vmin of a voltage value that can drive the auxiliaries 32 and smaller than the maximum rated voltage value Vmax of the battery 31. This can maintain appropriate operation of the auxiliaries 32 and the battery 31.

(5) when the battery voltage sensor 34 is normal, and an error is detected in at least one of the battery current sensor 33 and the battery temperature sensor 35, the autonomous driving ECU 56 sets the terminal voltage value of the battery 31 detected by the battery voltage sensor 34 to be an initial value of the command generation voltage value Vtgt of the alternator 23. The autonomous driving ECU 56 gradually increases the command generation voltage value Vtgt of the alternator 23 from the initial value. In this way, even when an error occurs in at least one of the battery current sensor 33 and the battery temperature sensor 35, the generation voltage value of the alternator 23 can be increased more certainly. Thus, electrical power required for driving the auxiliaries 32 can be readily maintained. Thus, appropriate operation of the auxiliaries 32 can be readily maintained.

(6) When the battery current sensor 33 is normal and an error is detected in the battery voltage sensor 34, the autonomous driving ECU 56 sets the command generation voltage value of the alternator 23 at the time of detection of the error to be an initial value. The autonomous driving ECU 56 gradually increases the command generation voltage value Vtgt of the alternator 23 from the initial value. Furthermore, the autonomous driving ECU 56 varies the increment of the command generation voltage value Vtgt on the basis of the charge current value i of the battery 31 detected by the battery current sensor 33. Specifically, when the charge current value i of the battery 31 detected by the battery current sensor 33 is larger than the predetermined value i0, the autonomous driving ECU 56 decreases the increment of the command generation voltage value Vtgt in comparison with when the charge current value i is smaller than or equal to the predetermined value i0. This can suppress a decrease in the voltage applied to the auxiliaries 32 caused by an excessive charge current value i of the battery 31. Thus, appropriate operation of the auxiliaries 32 can be readily maintained.

(7) When errors are detected in both the battery current sensor 33 and the battery voltage sensor 34, the autonomous driving ECU 56 increases the command generation voltage value Vtgt of the alternator 23 in a predetermined pattern. In this way, even when errors occur in both the battery current sensor 33 and the battery temperature sensor 35, the generation voltage value of the alternator 23 can be increased more certainly. Thus, electrical power required for driving the auxiliaries 32 can be readily maintained. Thus, appropriate operation of the auxiliaries 32 can be readily maintained.

(8) The autonomous driving ECU 56 permits autonomous driving control while restricting vehicle control that might cause unstable power generation by the alternator 23. Specifically, the autonomous driving ECU 56 prohibits exhaust-gas recirculation control and fuel cut control of the engine 21 and restricts driving of the compressor 41. In this way, power generation by the alternator 23 can be more certainly performed. Thus, an electrical power supply to the auxiliaries 32 can be maintained. Thus, appropriate operation of the auxiliaries 32 can be readily maintained.

(9) The autonomous driving ECU 56 permits autonomous driving control while prohibiting idling stop control of the engine 21. This can avoid a situation in which the engine 21 stopped by idling stop control cannot be restarted.

Other Embodiments

Note that the above-described embodiments may be implemented as the following modes.

The autonomous driving ECU 56 according to the first embodiment may be triggered by detection of at least one error in the battery current sensor 33, the battery voltage sensor 34, and the battery temperature sensor 35 to cause a process to interrupt the process illustrated in FIG. 2. Similarly, the autonomous driving ECU 56 according to the second embodiment may be triggered by detection of at least one error in the battery current sensor 33, the battery voltage sensor 34, and the battery temperature sensor 35 to cause a process to interrupt the process illustrated in FIG. 3.

When a positive determination is made in step S21 illustrated in FIG. 3, the autonomous driving ECU 56 according to the second embodiment may take various other measures to prevent engine stall. An example of a measure to prevent engine stall includes prohibiting factors that cause unstable combustion of the engine 21. Specifically, examples of such a measure includes prohibiting lean burn control, prohibiting catalyst warm-up control, such as ignition retarding control, prohibiting direct injection control when port injection to the engine 21 is possible, and prohibiting intake valve late closing control. A measure that reduces the occurrence of engine stall may be implemented. An example of a measure that reduces the occurrence of engine stall includes an increase in the idle rotational rate and transmission control on a side lower than normal.

As indicated by the dashed lines in FIG. 1, the vehicle system 10 may be provided with a sub-battery 38 besides the battery 31. The sub-battery 38 provides auxiliary power to the auxiliaries 32 when the charge level of the battery 31 is low. When the vehicle is provided with the sub-battery 38, the autonomous driving ECU 56 may execute the various processes according to the first and second embodiments, in consideration of the state of charge of the sub-battery 38.

The autonomous driving ECU 56 according to each embodiment may execute a process of permitting only a portion of the autonomous driving control, in place of the process of prohibiting the autonomous driving control.

The means and/or functions of the autonomous driving ECU 56 can be provided by software stored in a substantial memory and a computer that executes the software, only software, only hardware, or any combination of these. For example, when the autonomous driving ECU 56 is provided by an electronic circuit, which is hardware, the autonomous driving ECU 56 can be provided by a digital circuit including many logic circuits or an analog circuit.

The present disclosure is not limited by the specific examples described above. The specific examples described above modified by a person having ordinary skill in the art may also be included in the scope of the present disclosure as long as they have the features of the present disclosure. The components included in the specific examples described above, and the arrangement, conditions, shape, and the like of the components are not limited to those illustrated, and can be appropriately modified. The components included in the above-described specific examples can be appropriately changed in combination as long as no technical contradiction arises.

What is claimed is:

1. A vehicle system comprising:
a generator configured to generate electrical power based on power transmitted from an engine of a vehicle;
a battery chargeable with the electrical power generated by the generator;
a detector of a plurality of detectors configured to detect a state of charge of the battery; and
a controller configured to perform autonomous driving control of the vehicle, wherein:
when an error is detected in a functionality of the detector, the controller permits the autonomous driving control while gradually increasing a command generation voltage value of the generator;
the controller restricts the command generation voltage value of the generator to a value smaller than or equal to a predetermined value while gradually increasing the command generation voltage value of the generator;
the predetermined value is set to a value (i) larger than or equal to a minimum value of a voltage value capable of driving auxiliaries receiving electrical power from the battery and (ii) smaller than a maximum rated voltage value of the battery; and
the controller maintains the command generation voltage value of the generator at the predetermined value after the command generation voltage value reaches the predetermined value.

2. The vehicle system according to claim 1, wherein the controller prohibits the autonomous driving control as a restriction on operation of equipment of the vehicle.

3. The vehicle system according to claim 1, wherein:
the detector includes:
a voltage sensor detecting a terminal voltage value of the battery;
a current sensor detecting a charge current value of the battery; and
a temperature sensor detecting a temperature of the battery, and
when the voltage sensor is operating normally and the error is detected in at least one of the current sensor and the temperature sensor, the controller sets the terminal voltage value of the battery detected by the voltage sensor to be an initial value of the command generation voltage value of the generator and increases the command generation voltage value of the generator from the initial value.

4. The vehicle system according to claim 1, wherein:
the detector includes:
a voltage sensor detecting a terminal voltage value of the battery; and
a current sensor detecting a charge current value of the battery,
when the current sensor is operating normally and the error is detected in the voltage sensor, the controller sets the command generation voltage value of the generator, which is set at the time the error is detected, to be an initial value of the command generation voltage value of the generator and increases the command generation voltage value of the generator from the initial value, and
the controller varies an increment of the increase in the command generation voltage value based on the charge current value of the battery detected by the current sensor.

5. The vehicle system according to claim 4, wherein, when the charge current value of the battery detected by the current sensor is larger than a predetermined value, the controller decreases the increment of the increase in the command generation voltage value of the generator in comparison with when the charge current value is smaller than or equal to the predetermined value.

6. The vehicle system according to claim 1, wherein:
the detector includes:
- a voltage sensor detecting a terminal voltage value of the battery; and
- a current sensor detecting a charge current value of the battery, and when errors are detected in both the voltage sensor and the current sensor, the controller increases the command generation voltage value of the generator in a predetermined pattern.

7. The vehicle system according to claim 1, wherein the controller further restricts vehicle control that leads to unstable electrical power generation by the generator as a restriction to operation of the equipment of the vehicle.

8. The vehicle system according to claim 1, wherein the controller also prohibits idling stop control of the engine as a restriction to operation of the equipment of the vehicle.

9. The vehicle system according to claim 1, wherein:
each of the plurality of detectors has a redundant structure and each of the plurality of detectors is configured to transmit a redundant signal, and
the controller is configured to compare a plurality of the redundant signals and determine whether error occurs in the plurality of detectors based on a result of the comparison.

* * * * *